Patented Aug. 13, 1940

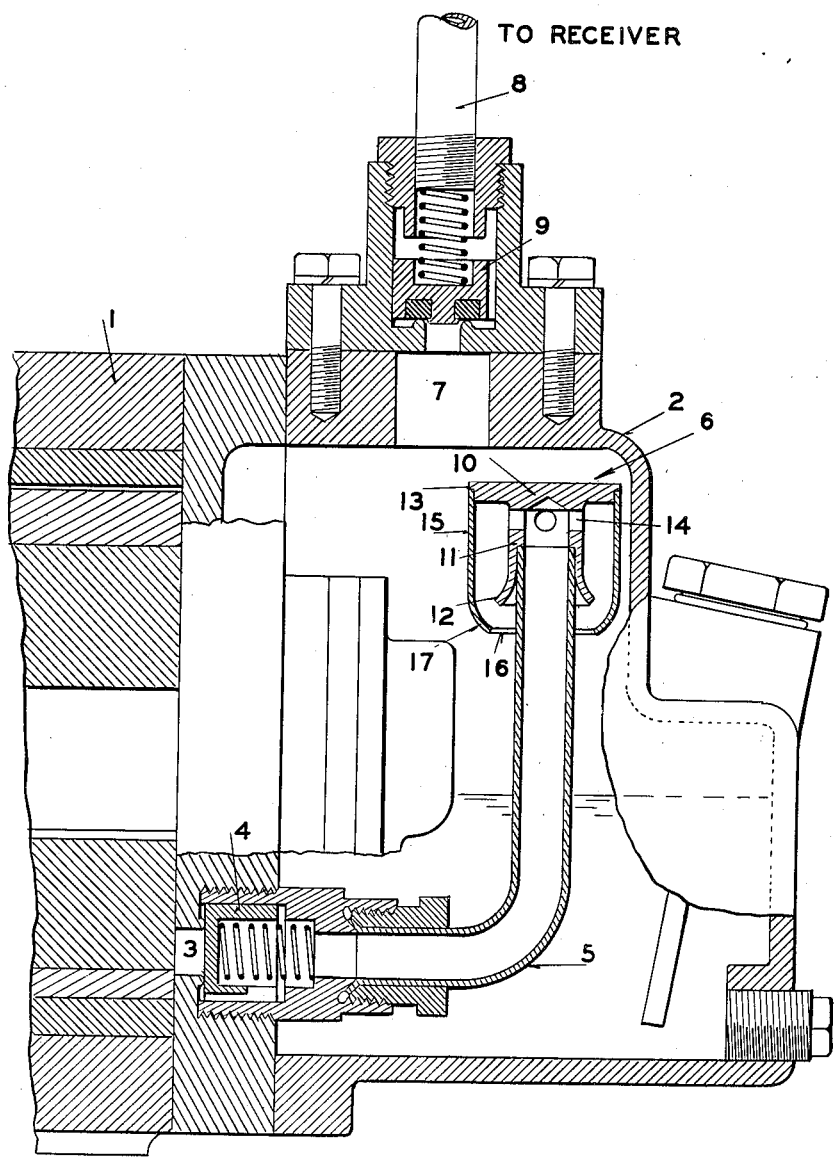

2,211,422

UNITED STATES PATENT OFFICE 2,211,422

OIL SEPARATOR

Bernard H. Hettinger, St. Louis, Mo., assignor to Wagner Electric Corporation, St. Louis, Mo., a corporation of Delaware Application May 19, 1939, Serial No. 274,543

3 Claims. (Cl. 183—93)

My invention relates to oil separators and more particularly to oil separators for removing oil present in compressed air discharged by a compressor.

One of the objects of my invention is to provide a simply constructed oil separator which will efficiently remove a substantial portion of the oil carried by the compressed air.

Other objects will become apparent from the following description taken in connection with the accompanying drawing in which the single figure is a cross-sectional view of a portion of a compressor showing my novel oil separator associated therewith, the latter also being shown in cross section.

Referring to the figure, numeral 1 indicates a portion of a rotary compressor of well-known construction and 2 an oil dome attached to the end plate thereof. A suitable lubricating oil is stored in the bottom portion of the dome and is employed to lubricate the parts of the compressor by being fed into the compressor through the rotor shaft in a well-known manner. The air which is compressed by the compressor is discharged through the outlet port 3 past a check valve 4 and into a pipe 5 which extends into the upper portion of the oil dome and above the oil line. The compressed air coming from the compressor is laden with oil which has been picked up from the lubricant in the compressor during the compressing operation. To eliminate the major portion of this oil from the compressed air and prevent it from going into the receiver, I have associated with the upper end of the discharge pipe 5, my novel oil separator indicated generally by the numeral 6. After the air has passed through this separator, it has had eliminated therefrom a substantial amount of the oil and the air is free to pass out of the oil dome through the outlet 7 and into the receiver or storage tank (not shown) through conduit 8. A check valve 9 prevents the compressed air from returning to the oil dome.

My novel oil separator comprises a member 10 having a downwardly extending cylindrical portion 11 provided with a flared end portion 12 which receives the end of the discharge pipe 5 to thereby mount the separator directly on the end of the pipe. The member 10 is also provided with an annular flange 13 which is an extension of the portion which closes the upper end of the cylindrical portion 11. The upper end of the cylindrical portion is provided with a plurality of spaced radially extending passages 14 which direct the oil laden air radially outwardly from the interior chamber of the cylindrical portion 11.

A cylindrical member 15 surrounds the cylindrical portion 11 in spaced relation and is attached at its upper end to the flange 13, this flange serving as a closure for the upper end of said cylindrical member. The cylindrical member extends to a point below the flared end 12 of the cylindrical portion 11 and the lower end of the cylindrical member is provided with a reduced opening 16 formed by inwardly extending curved wall 17 on the lower portion of the cylindrical member. The pipe 5 extends through the opening 16, there being sufficient space between the pipe and wall 17 to permit free passage of air.

In operation, the oil laden compressed air coming from the discharge port of the compressor passes upwardly through pipe 5 and impinges upon the top wall of the cylindrical chamber formed by the cylindrical portion 11 where it is forced radially outward through passages 14. In passing through these passages there is a tendency for any oil in the air to be condensed into fairly large particles and as the air impinges upon the wall of the cylindrical member 15, the particles of oil in the air will be precipitated and collect on this wall and then run down the sides of the cylindrical member, out through the opening 16 and brought back into the bottom of the oil dome. A part of the air striking the wall of the cylindrical member 15 will be deflected back onto the outer surface of the flared portion 12 where additional oil will be precipitated as a result of the impingement of the air on this surface. This oil will also run down through the opening 16 and back into the bottom of the dome. When the air stream strikes the flared portion 12, it will again be re-directed against the inwardly extending curved wall 17 and as a result of its impingement on this wall, additional oil will collect thereon. The curved wall 17 will again redirect the air against the outer surface of pipe 5 where additional oil will be precipitated and run down the pipe into the bottom of the dome. The air passing out of opening 16 at the bottom of the cylindrical member 15 now has had separated therefrom a substantial amount of oil carried thereby and will be free to pass upwardly and out of outlet 17 to the receiver.

It will be noted that the oil separator is very simple in construction comprising only two parts but so constructed and associated with each other that the air will impinge upon a plurality of surfaces and thus cause the oil therein to be precipitated as it passes through the separator.

The construction of the separator is also such that it can be readily attached to the end of a discharge pipe.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. An oil separator for removing oil carried by compressed air discharged from a compressor, said separator comprising a member of integral construction provided with a chamber having an inlet adapted to be connected to the discharge conduit of the compressor and with a closed wall opposite said inlet and upon which the compressed air can impinge, said chamber being provided with passages in its side walls, means carried by the member and forming a chamber surrounding the first named chamber and having walls spaced from the exterior walls of said first chamber and upon which the air flowing through the passages may impinge, said means at the lower end of said last named chamber having inwardly extending walls and being provided with an overside opening which is adapted to receive the end of the discharge conduit of the compressor and permit its connection with the member, and the outer walls of the member at a point below the passages being so formed as to direct air outwardly against the walls of the second named chamber at a point above the inwardly extending walls.

2. An oil separator for association with the open end of a discharge pipe, said separator comprising a cylindrical member having a flared end for receiving the end of the pipe, said member being closed at its end opposite the pipe inlet and provided in its wall with passages adjacent said closed end, and a second cylindrical member in spaced surrounding relation to the first cylindrical member and the end of the pipe, said second cylindrical member having a restricted open end formed by an inwardly extending end wall positioned beyond the flared end of the first named cylindrical member, said open end being oversize with respect to the pipe and having the pipe extend therethrough.

3. An oil separator for association with the open end of a discharge pipe, said separator comprising a member having an integral downwardly extending cylindrical portion provided with a flared end for receiving the end of the pipe and also with a portion forming a top wall for the cylindrical portion and provided with an annular flange, and a cylindrical member secured at its top end to the flange of the first named member and in surrounding relation to the cylindrical portion thereof, the lower end of said cylindrical member projecting below the flared end of the cylindrical portion and having an inwardly extending annular wall the opening in which is greater than the pipe.

BERNARD H. HETTINGER.